Nov. 20, 1928.
H. BERGMANN
1,692,108
AEROPLANE SAFETY DEVICE
Filed Aug. 22, 1927
2 Sheets-Sheet 1
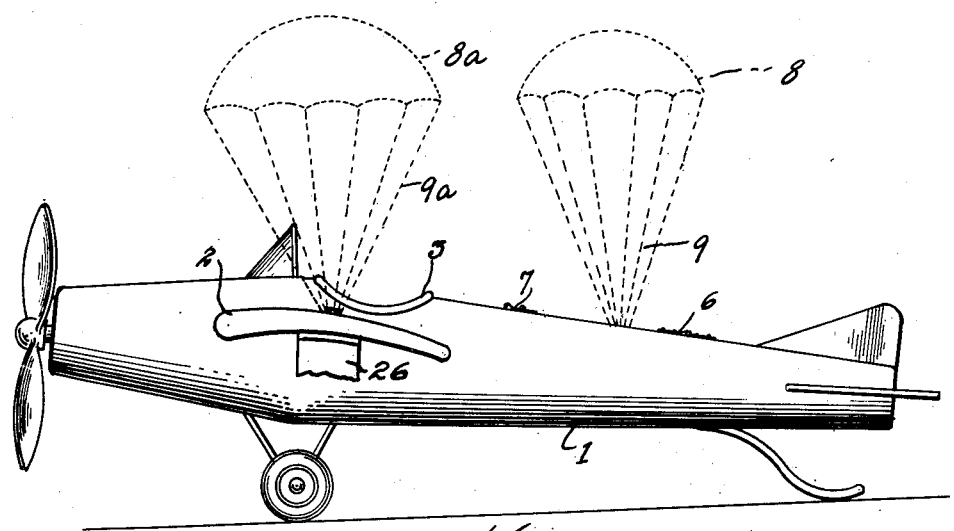
Fig. 1
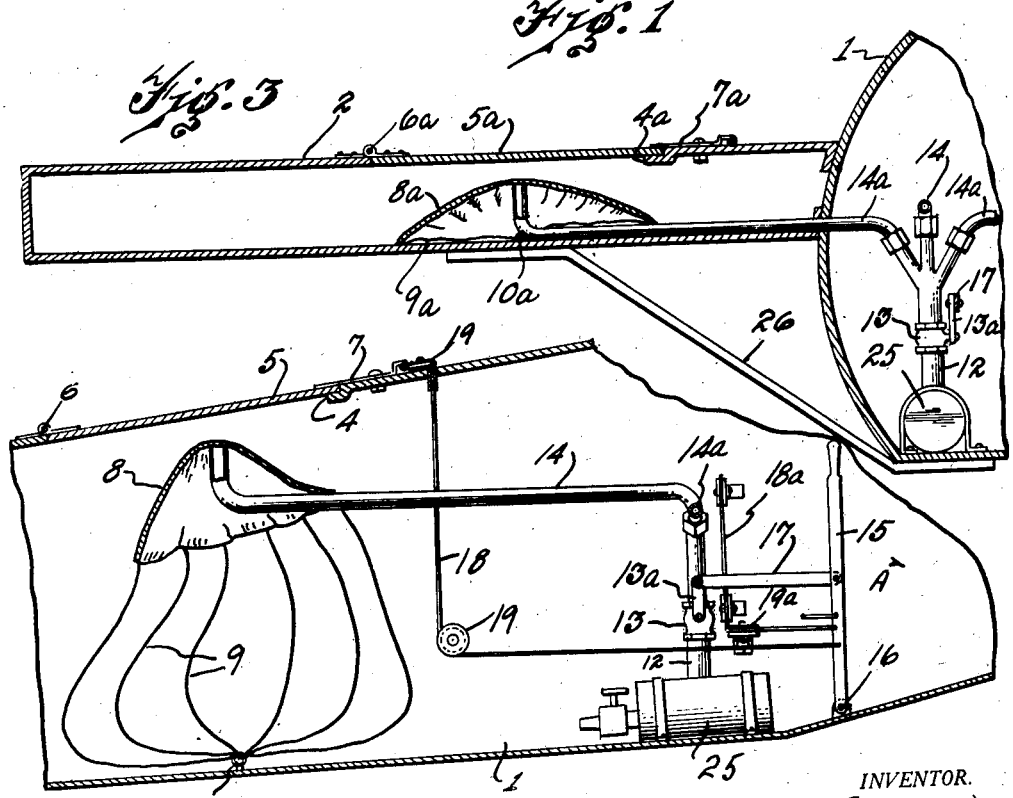
Fig. 3
Fig. 4
INVENTOR.
Hermann Bergmann
BY
Grant Baldwin
ATTORNEY.

Nov. 20, 1928.
H. BERGMANN
AEROPLANE SAFETY DEVICE
Filed Aug. 22, 1927
1,692,108
2 Sheets-Sheet 2
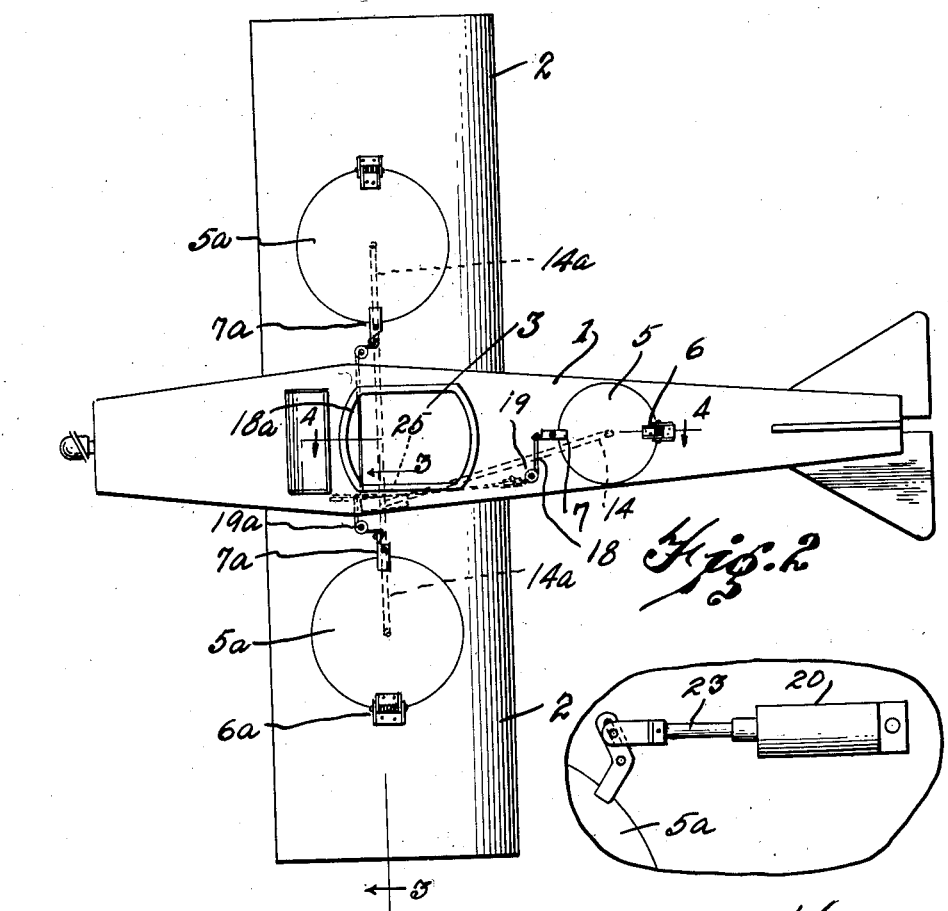
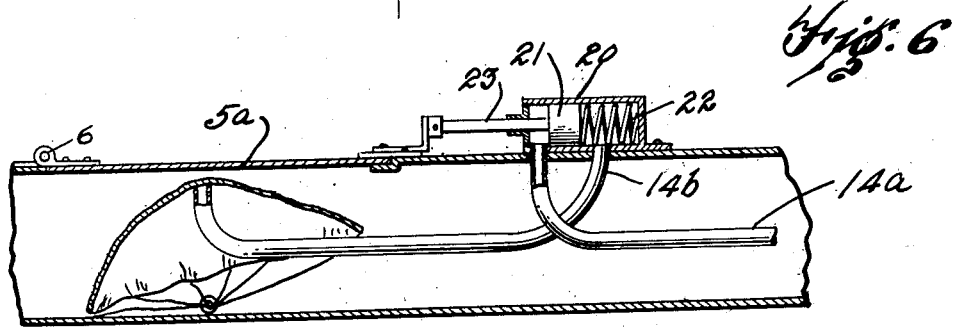
INVENTOR.
Hormann Bergmann
BY
ATTORNEY.

Patented Nov. 20, 1928.

1,692,108

UNITED STATES PATENT OFFICE.

HERMANN BERGMANN, OF DETROIT, MICHIGAN.

AEROPLANE SAFETY DEVICE.

Application filed August 22, 1927. Serial No. 214,503.

This invention relates to improvements in aeroplane safety devices, and refers more particularly to means for retarding the fall of an aeroplane in the event of its getting out of control on account of engine failure or for any other cause.

It is an object of the invention to provide an aeroplane safety device which can be quickly applied to any type of plane, and which is cheap to manufacture.

Another object of the invention is to provide an aeroplane safety device which can be quickly released with one operation, and which will move rapidly into operative position.

With these and other objects in view, the invention is hereinafter more fully described with the aid of the accompanying drawings, in which:

Figure 1 illustrates a side elevation of an aeroplane with the safety device in operative position, and Figure 2 shows a plan view of an aeroplane and the relative positions of the various parts of the device.

Figures 3 and 4 are enlarged sections on the lines 3—3 and 4—4 of Figure 2.

Figure 5 is a sectional view showing a modified form of construction, and

Figure 6 is a plan view of Figure 5.

Referring to the drawings, 1 designates an ordinary aeroplane body having conventional wings 2 and a cockpit 3. Through the upper surface of the body is an opening 4 normally closed by a cover 5, which latter is attached by means of a spring hinge 6 to the said body. 7 indicates a catch pivotally mounted on the body to hold the cover in closed position against the tension of the spring hinge. Within the body and under the opening 4 is a parachute 8 fastened by ropes 9 to a suitable anchor, such as the eyebolt 10 within the body.

Similarly in the upper surface of the wings 2 are openings $4^a$ normally closed by covers $5^a$. These covers are pivotally mounted on the wings by spring hinges $6^a$, and the latter are normally prevented from swinging the covers into open position by pivotally arranged catches $7^a$ which engage the opposite margins of the covers. Under the openings $4^a$ parachutes $8^a$ are secured by ropes $9^a$ to fastening means, such as eyebolts $10^a$, within the said wings.

In the cockpit, or adjacent to it, a compressed air tank 25 is secured. From this tank is a feed pipe 12 having a valve 13 therein. The feed pipe terminates at its opposite end in a plurality of branches 14 and $14^a$. The branch 14 runs rearwardly of the machine and has an upturned open end located under the parachute 8; the branches $14^a$ run laterally one into each wing and have open upturned ends which terminate under the parachutes $8^a$.

Within easy reach of the operator in the cockpit is a lever 15. This lever is preferably pivotally secured to the floor as shown at 16. 17 indicates a link connected to the lever and also to a handle $13^a$ on the valve 13. To this lever a plurality of cords 18 and $18^a$ are also secured. The cord 18 passes around pulleys 19 revolvably mounted on the body and is fastened at its opposite end to the catch 7, and the cords $18^a$ pass around pulleys $19^a$ and have their opposite ends secured to the catches $7^a$.

From the foregoing it will be seen that when the lever is moved in the direction of the arrow A the catches release the covers 5 and $5^a$ so that they will immediately be opened by their spring hinges 6 and $6^a$ respectively, and the valve 14 is also opened so that compressed air passes out of the ends of the pipes 14 and $14^a$ and blows the parachutes 8 and $8^a$ out of the body and wings respectively.

26 designates a brace the ends of which are secured to the underside of the wings under the eyebolts $10^a$, and the central portion of which is secured to the underside of the body of the aeroplane. This brace reinforces the wings against the sudden upward pull which results as the parachutes are released and become operative.

Figure 5 shows a modified form of construction wherein the branch pipe $14^a$ terminates in one end of a cylinder 20. In this cylinder is a piston 21 normally held by the tension of a spring 22 towards the end of the cylinder into which the pipe $14^a$ is run. Secured to the piston is a rod 23 the outer end of which is fastened to the catch $7^a$. Through the side of the cylinder 20 a second pipe $14^b$ is provided the opposite end of which is open and is located under the parachute $8^a$. So that when the valve 13 is open air passes through the pipe $14^a$, into the cylinder 20, moves the piston 21 against the tension of the spring 22 so that the air may escape through the pipe $14^b$ and discharges through the open end of the latter. Obviously this causes the catch $7^a$ to turn so that the cover is free to be opened by its spring hinge, and the air also forces the parachute 8ª out through the opening 4ª.

When the construction shown in Figures 5 and 6 is employed the lever 15 may be done away with and the entire mechanism operated by the valve handle 13ª.

While in the foregoing the preferred embodiments of the invention have been described and shown, it is understood that the construction is susceptible to such modifications as fall within the scope of the appended claim.

What I claim as my invention and desire to secure by Letters Patent is:

In an aeroplane safety device, the combination of an aeroplane having a body and wings, said body and wings having openings in their upper sides, covers on said openings, means for tending to open said covers, catches for holding said covers in closed position, parachutes in and secured to said body and wings under said openings, cylinders on said aeroplane one adjacent to each of said covers, pistons in said cylinders, piston rods extending from said pistons and adapted to release said catches, a tank on said aeroplane adapted to contain a compressed fluid, pipes from said tank to one end of each of said cylinders, a valve to control the outlet from said tank into said pipes, and other pipes from said cylinders terminating under said parachutes, said other pipes being so connected to said cylinders that when said pistons have been moved a predetermined distance by the compressed fluid the ends of these other pipes become exposed to said fluid so that the latter exhausts under said parachutes and ejects the latter through said openings.

HERMANN BERGMANN.